(12) United States Patent
Komori et al.

(10) Patent No.: US 10,236,671 B2
(45) Date of Patent: Mar. 19, 2019

(54) SEALING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Hiroki Hirai, Mie (JP); Tomoyuki Sakata, Mie (JP); Makoto Higashikozono, Mie (JP); Masato Tsutsuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 228 days.

(21) Appl. No.: 15/316,340

(22) PCT Filed: Jun. 23, 2015

(86) PCT No.: PCT/JP2015/067970
§ 371 (c)(1),
(2) Date: Dec. 6, 2016

(87) PCT Pub. No.: WO2015/199056
PCT Pub. Date: Dec. 30, 2015

(65) Prior Publication Data
US 2018/0109097 A1  Apr. 19, 2018

(30) Foreign Application Priority Data
Jun. 26, 2014 (JP) .................. 2014-131701

(51) Int. Cl.
*H02G 15/013* (2006.01)
*H01B 7/282* (2006.01)
(Continued)

(52) U.S. Cl.
CPC ........... *H02G 15/013* (2013.01); *H01B 7/282* (2013.01); *H01R 13/5205* (2013.01); *H02G 3/22* (2013.01); *H02G 15/046* (2013.01); *Y02A 30/14* (2018.01)

(58) Field of Classification Search
CPC ...... H02G 15/013; H02G 3/22; H02G 15/046; H01B 7/282; H01R 13/5205; Y02A 30/14
(Continued)

(56) References Cited

U.S. PATENT DOCUMENTS 5,720,487 A * 2/1998 Kato .................. H01R 13/5205
277/637
6,241,554 B1  6/2001 Murakami et al.
(Continued)

FOREIGN PATENT DOCUMENTS

CN  2615930  5/2004
CN  103094874  5/2013
(Continued)

OTHER PUBLICATIONS

Official Communication issued in European Patent Office (EPO) Patent Application No. 15812206.9, dated Jan. 15, 2018.
(Continued)

*Primary Examiner* — Nathan Cumar
(74) *Attorney, Agent, or Firm* — Greenblum & Bernstein, P.L.C.

(57) ABSTRACT

A sealing member includes a rubber stopper and a guide member. The rubber stopper includes an electric wire through portion including first to fourth through holes through which first to fourth electric wires are passed,
(Continued)

respectively. The guide member is located more to a rear than the electric wire through portion in an extending direction in which the first to the fourth electric wires passed through the first to the fourth through holes extend. The guide member includes first to fourth guide holes through which the first to the fourth electric wires are passed and aligned with the first to the fourth through holes.

18 Claims, 19 Drawing Sheets

(51) Int. Cl.
*H02G 3/22* (2006.01)
*H01R 13/52* (2006.01)
*H02G 15/04* (2006.01)

(58) Field of Classification Search
USPC .......................................................... 277/607
See application file for complete search history.

(56) References Cited

U.S. PATENT DOCUMENTS

| 8,727,799 | B2 | 5/2014 | Osawa et al. | |
|---|---|---|---|---|
| 2011/0159729 | A1* | 6/2011 | Suzuki | H01R 13/504 |
| | | | | 439/587 |
| 2012/0071029 | A1* | 3/2012 | Millevik | F16L 5/08 |
| | | | | 439/607.25 |
| 2013/0105219 | A1* | 5/2013 | Osawa | H01R 13/5208 |
| | | | | 174/77 R |
| 2014/0045357 | A1* | 2/2014 | Nugent | H01R 13/5221 |
| | | | | 439/275 |

FOREIGN PATENT DOCUMENTS

| DE | 3417811 | 10/1985 |
|---|---|---|
| EP | 0580130 | 1/1994 |
| EP | 1058354 | 12/2000 |
| EP | 2587594 | 5/2013 |
| JP | 06-38339 | 2/1994 |
| JP | 11-329567 | 11/1999 |
| JP | 2013-097898 | 5/2013 |

OTHER PUBLICATIONS

U.S. Appl. No. 15/317,290 to Komori et al., filed Dec. 8, 2016.
Search Report issued in PCT Patent Application No. PCT/JP2015/067970, dated Sep. 29, 2015.
Office Action issued in Japan Counterpart Patent Appl. No. 2014-131701, dated Sep. 15, 2015 , along with an English translation thereof.
Written Opinion of the International Searching Authority issued in PCT Patent Application No. PCT/JP2015/067970, dated Sep. 29, 2015, along with an English translation thereof.
Office Action issued in China Counterpart Patent Appl. No. 201580033883.9, dated Apr. 25, 2018 , along with an English translation thereof.
Office Action issued in China Counterpart Patent Appl. No. 201580033883.9, dated Aug. 16, 2017 , along with an English translation thereof.
Official Communication issued in EPO Patent Appl. No. 15812206.9, dated Jul. 26, 2018.

* cited by examiner

SEALING MEMBER

TECHNICAL FIELD

The present invention relates to a sealing member.

BACKGROUND ART

Conventionally, a rubber stopper for collectively protecting multiple electric wires from water disclosed in JPH11-329567A (Patent Document 1) has been known. The rubber stopper includes multiple wire through holes through which the electric wires are passed, respectively. Outer peripheries of the electric wires are tightly held against inner walls of the respective through holes to tightly fit the electric wires in the rubber stopper. Furthermore, an outer periphery of the rubber stopper is tightly held against an inner wall of a rubber stopper attachment hole of a case to tightly fit the rubber stopper in the case.

CITATION LIST

Patent Document 1: JPH11-329567A

In the known technology, a cover is fitted on a rear end of the case via a locking portion so as to be removal. The cover includes wire through holes through which the wires are passed, respectively.

In the known technology, if a relatively strong force is applied to the electric wires, the rubber stopper may be pulled by the electric wires and displaced. As a result, positions of the electric wire through holes of the rubber stopper relative to the electric wire through holes of the cover may shift and the electric wires may not be straight relative to a direction in which the through holes extends. Air tightness between the peripheries of the electric wires and the inner walls of the electric wire through holes decreases and air tightness between the electric wires and the rubber stopper may decreases.

SUMMARY

A sealing member according to the technique described in the present specification includes a rubber stopper and a rear guide member. The rubber stopper includes an electric wire through portion. The electric wire through portion includes through holes through which electric wires are passed, respectively. The rear guide member includes guide holes located more to a rear than the electric wire through portion in an extending direction in which the electric wires passed through the through holes extend and through which the electric wires are passed. The guide holes are aligned with the through holes of the rubber stopper.

According to the technique described in the present specification, the electric wires are passed through the guide holes of the rear guide member and properly guided to the through holes, respectively. According to the configuration, the electric wires are tightly held against inner walls of the through holes, respectively. Therefore, air tightness between the rubber stopper and the electric wires is less likely to decrease.

The following aspects of the technique described in the present specification may be applied to preferable embodiments.

The rear guide member may include a lock portion for locking with the rubber stopper. The rubber stopper may include a lock catch portion with which the lock portion is engaged. The rubber stopper may be held at a position relative to the rear guide member with the lock portion engaged with the lock catch portion such that the through holes of the rubber stopper are aligned with the guide holes of the rear guide member.

According the above aspect, the guide holes are properly held at positions at which the guide holes are aligned with the through holes, respectively. Therefore, the air tightness between the rubber stopper and the electric wires is less likely to decrease.

The sealing member may include a front guide member located more to a front than the electric wire through portion in the extending direction. The front guide member may include guide holes aligned with the plurality of through holes of the rubber stopper.

According the above aspect, the electric wires are guided from a side more to the front than the electric wire through portion in the extending direction to the through holes, respectively. Furthermore, the electric wires are guided from a side more to the rear than the electric wire through portion in the extending direction to the through holes, respectively. Therefore, the air tightness between the rubber stopper and the electric wires is less likely to decrease.

Electric wire-side lips may be formed on inner walls of the through holes. The electric wire-side lips may be tightly held against outer peripheries of the electric wires, respectively.

According the above aspect, the electric wire-side lips are tightly held against the outer peripheries of the electric wires. Therefore, the air tightness between the rubber stopper and the electric wires is less likely to decrease.

Effect of the Invention

According to the technique described in the present specification, the air tightness between the rubber stopper and the electric wires is less likely to decrease.

DESCRIPTION OF EMBODIMENTS

First Embodiment

Figure 1:
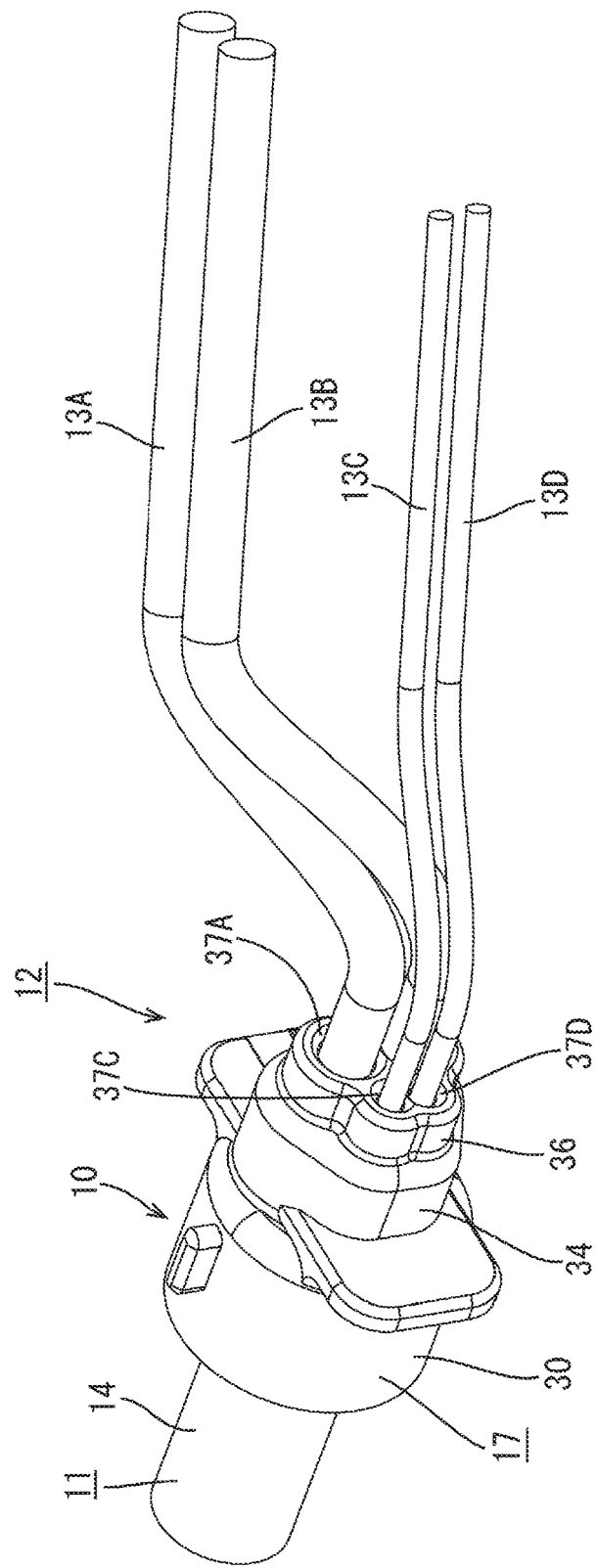
FIG. 1 is a perspective view illustrating a sealing structure of a multicore cable according to a first embodiment.
Figure 2:
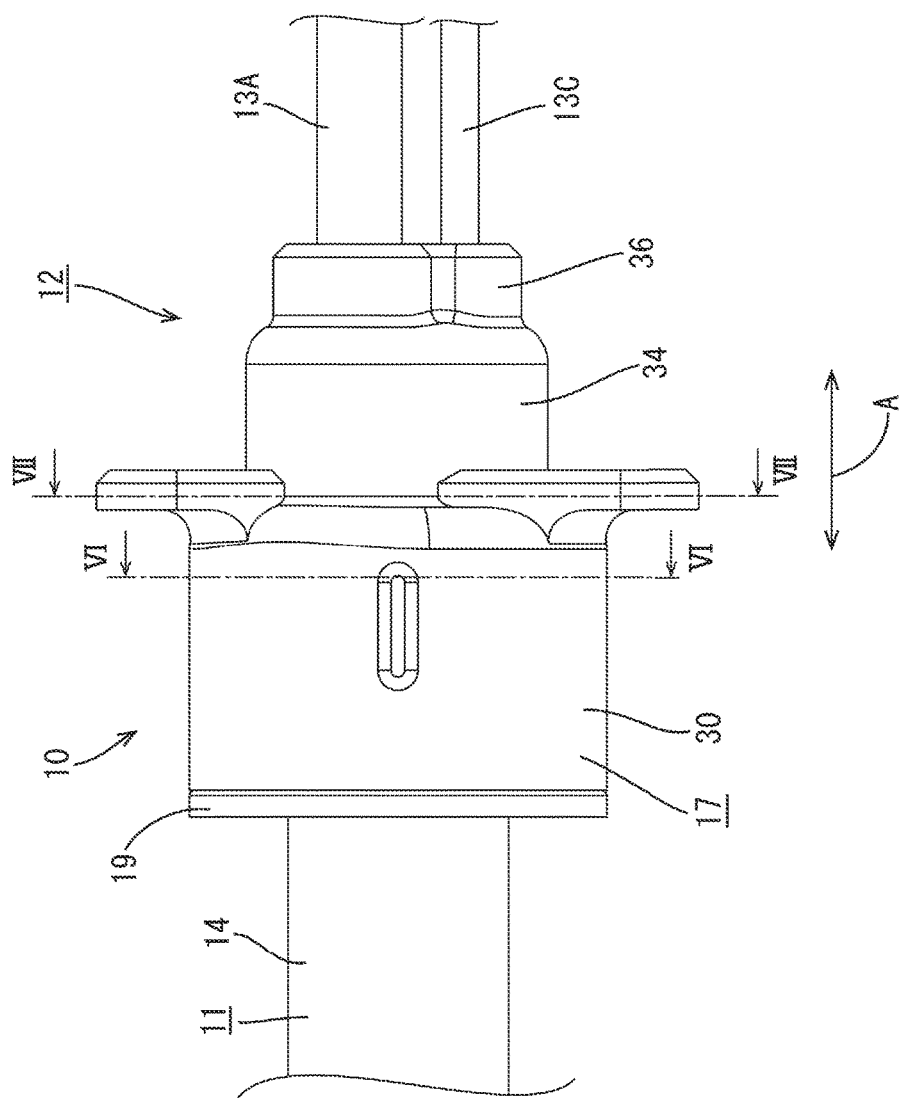
FIG. 2 is a plan view illustrating the sealing structure of the multicore cable.

A first embodiment including a sealing member 10 to which the technique described in the present specification is applied will be described with reference to FIGS. 1 to 19. This embodiment may be used for a wire harness for an electric parking brake installed in a vehicle (not illustrated). In the following description, a horizontal direction in FIG. 2 corresponds to an extending direction A in which electric wires 13A, 13B, 13C and 13D extend. The right side in FIG. 2 corresponds to a front in the extending direction A and the left side in FIG. 2 corresponds to a rear in the extending direction A.

Multicore Cable 11

As illustrated in FIGS. 1 to 4, the multicore cable 11 according to this embodiment includes the electric wires 13A, 13B, 13C and 13D (four electric wires in this embodiment) wrapped in a sheath 14 that is made of insulating synthetic resin. The electric wires 13A, 13B, 13C and 13D include metal core wires (not illustrated), respectively. Outer peripheries of the core wires are covered with insulating films (not illustrated), respectively. The multicore cable 11 has a round cross section.

Figure 6:
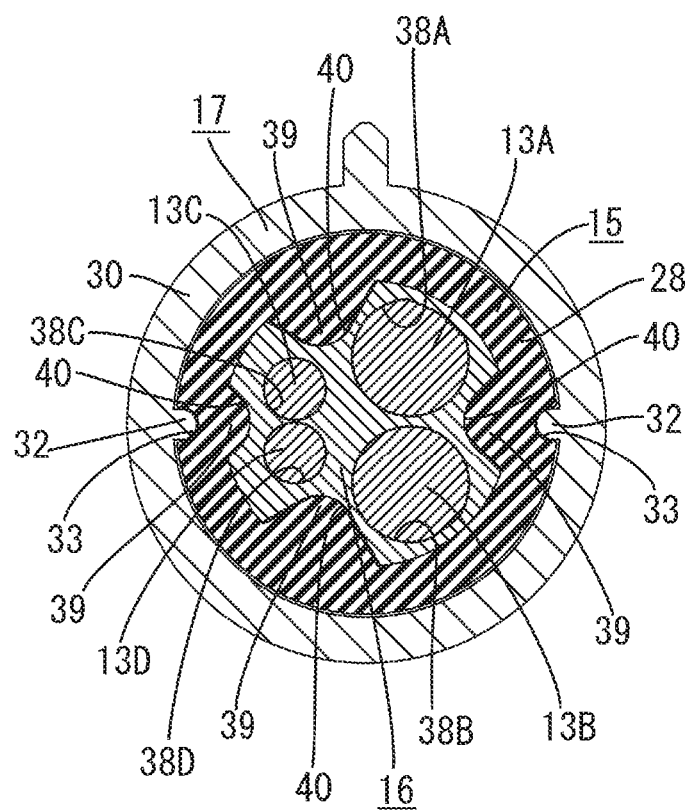
FIG. 6 is a cross-sectional view along line VI-VI in FIG. 2.
Figure 7:
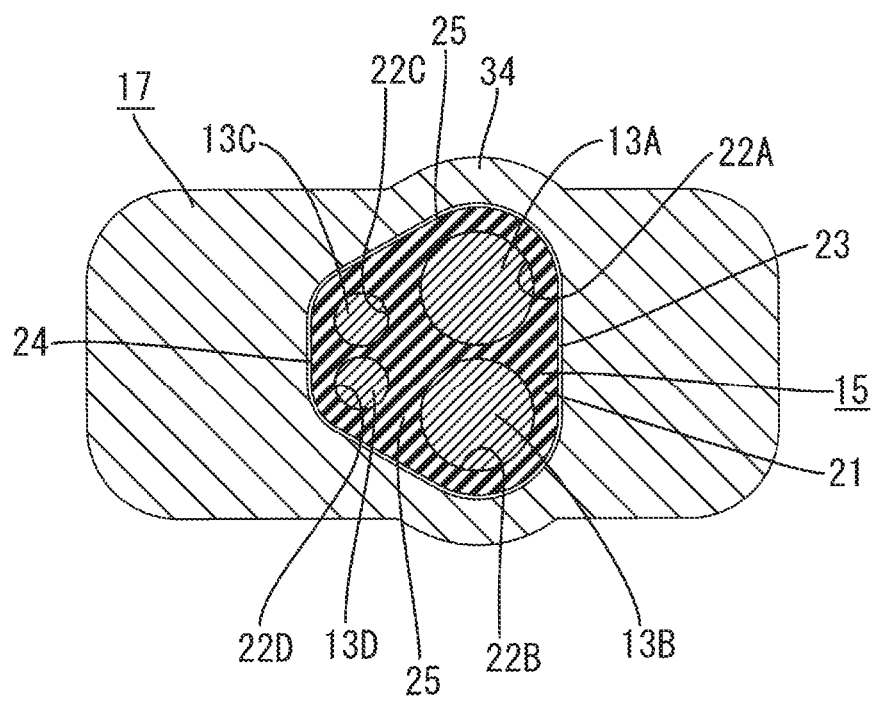
FIG. 7 is a cross-sectional view along line VII-VII in FIG. 2.

As illustrated in FIGS. 6 to 7, four electric wires 13A, 13B, 13C and 13D include two kinds of electric wires 13A, 13B, 13C and 13D having different outer diameters. This embodiment includes a first electric wire 13A, a second electric wire 13B, a third electric wire 13C, and a fourth electric wire 13D. The first electric wire 13A and the second electric wire 13B are to be connected to a motor of the electric parking brake. The third electric wire 13C and the fourth electric wire 13D are for a sensor in an antilock brake system. The first electric wire 13A, the second electric wire 13B, the third electric wire 13C, and the fourth electric wire 13D have round cross-sections, respectively.

The outer diameters of the first electric wire 13A and the second electric wire 13B are larger than the outer diameters of the third electric wire 13C and the fourth electric wire 13D. The outer diameters of the first electric wire 13A and the second electric wire 13B are about equal to each other. The outer diameters of the third electric wire 13C and the fourth electric wire 13D are about equal to each other. Portions of the first electric wire 13A, the second electric wire 13B, the third electric wire 13C, and the fourth electric wire 13D stick out of an end 14A of the sheath 14 of the multicore cable 11 and branch off.

Sealing Member 10

As illustrated in FIGS. 1 to 4, the sealing member 10 is attached to the end 14A of the sheath 14 of the multicore cable 11 and the portions of the first electric wire 13A, the second electric wire 13B, the third electric wire 13C, and the fourth electric wire 13D sticking out of the end 14A of the sheath 14 and branching off. The sealing member 10 restricts liquid such as water and oil from entering through the end 14A of the sheath 14. The sealing member 10 includes a rubber stopper 15, a guide member 16 (an example of a rear guide member), and a cap 17 (an example of a front guide member). The rubber stopper 15 is fitted on the end 14A of the sheath 14. A guide member 16 is attached to an inside of the rubber stopper 15. The cap 17 is fitted on the rubber stopper 15.

Rubber Stopper 15

Figure 3:
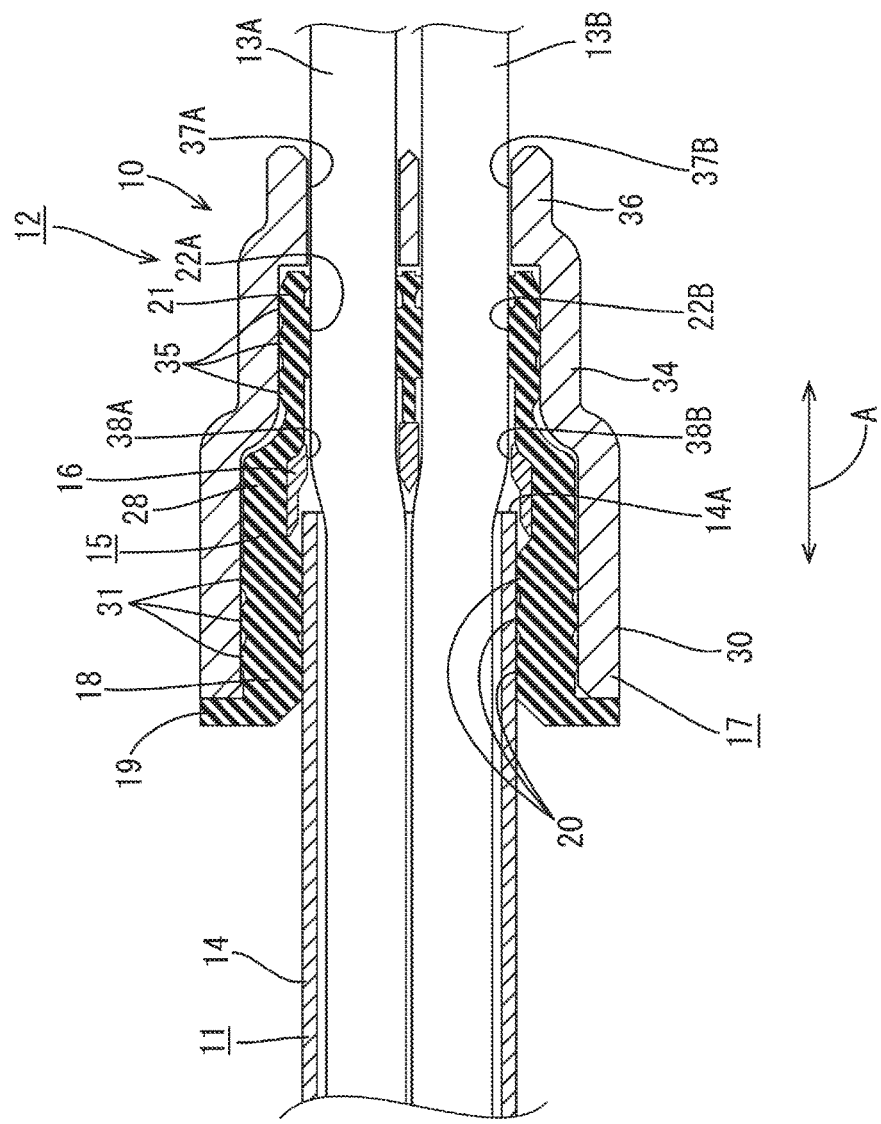
FIG. 3 is a cross-sectional view along line III-III in FIG. 5.
Figure 4:
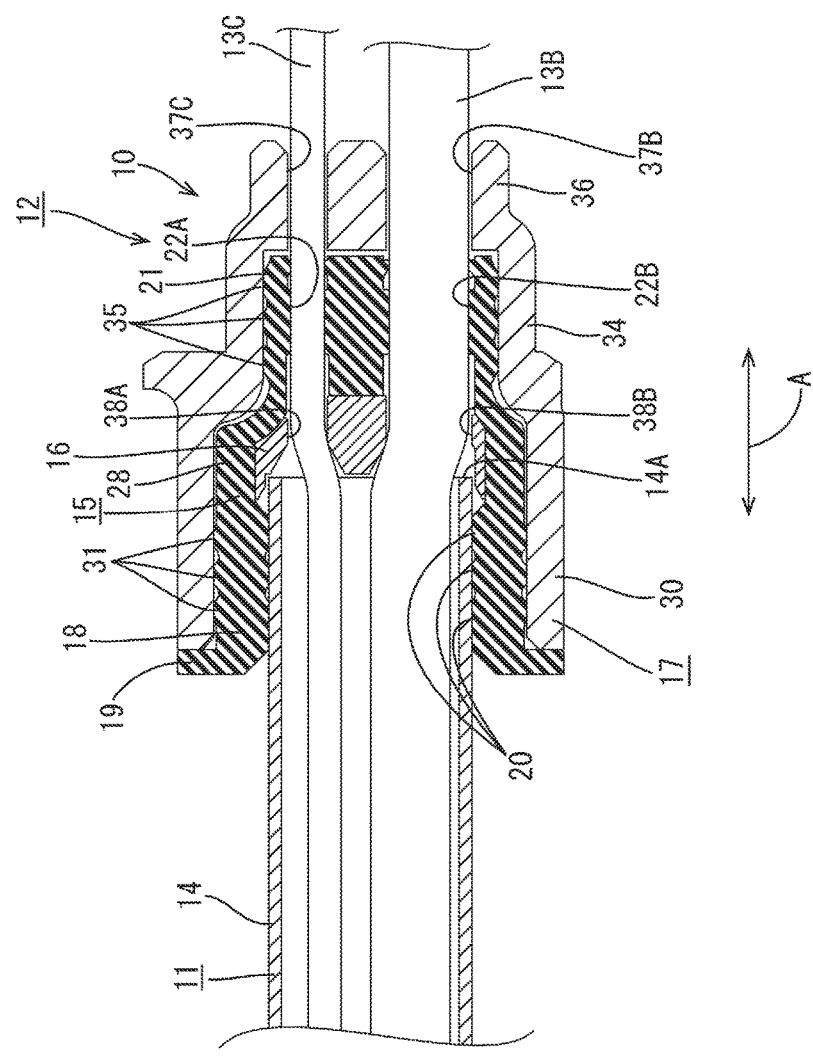
FIG. 4 is a cross-sectional view along line IV-IV in FIG. 5.
Figure 5:
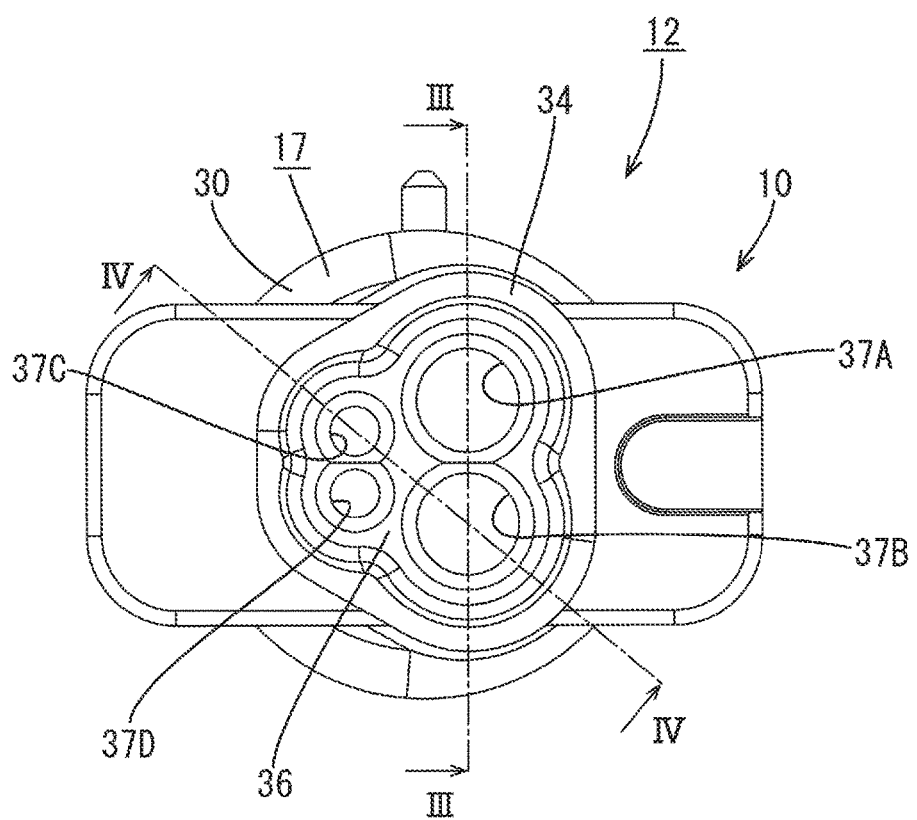
FIG. 5 is a front view of the sealing member.

As illustrated in FIGS. 3 and 4, the rubber stopper 15 is fitted on the end 14A of the sheath 14. The rubber stopper 15 includes a sheath fitting portion 18 that is fitted on the end 14A of the sheath 14. The sheath fitting portion 18 has a hood shape that extends in an opposite direction to the end 14A of the sheath 14 (toward the left side in FIG. 3) and opens toward the opposite direction to the end 14A of the sheath 14 (toward the left side in FIG. 3). Namely, the sheath fitting portion 18 has a hood shape that extends toward the rear in the extending direction A and opens toward the rear in the extending direction A. At an edge of the sheath fitting portion 18, a flange portion 19 is formed. The flange portion 19 projects outward in a radial direction of the sheath fitting portion 18. The sheath fitting portion 18 has a substantially tubular shape in a natural state.

Sheath-Side Lips 20

Figure 8:
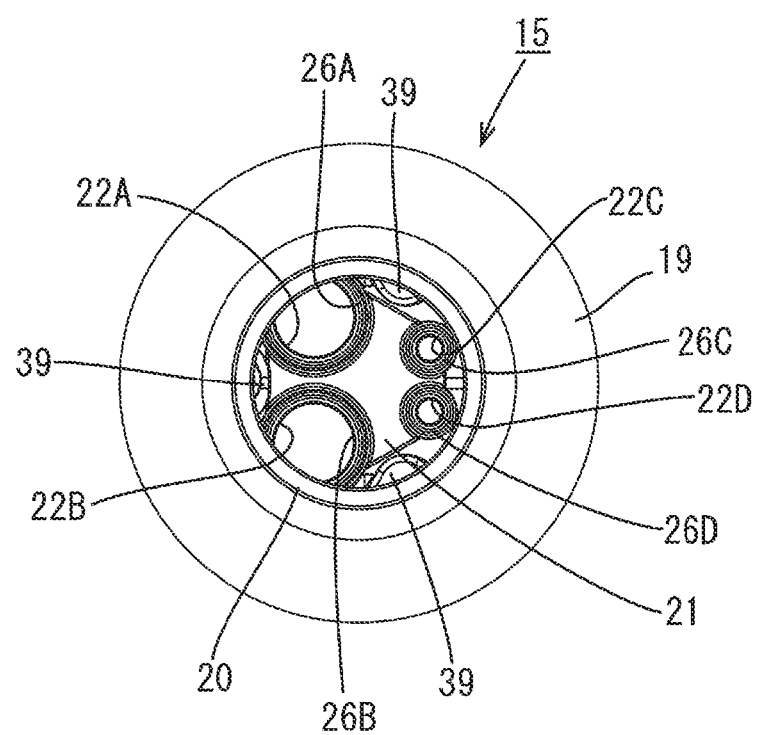
FIG. 8 is a rear view illustrating a rubber stopper.

As illustrated in FIGS. 3, 4 and 8, sheath-side lips 20 that project inward are formed on an inner periphery of the sheath fitting portion 18 annularly along the circumferential direction of the sheath fitting portion 18. When the sheath fitting portion 18 is fitted on the end 14A of the sheath 14, the sheath-side lips 20 are tightly held against the outer periphery of the sheath 14. According to the configuration, the rubber stopper 15 is tightly fitted to the sheath 14.

Wire Through Portion 21

Figure 9:
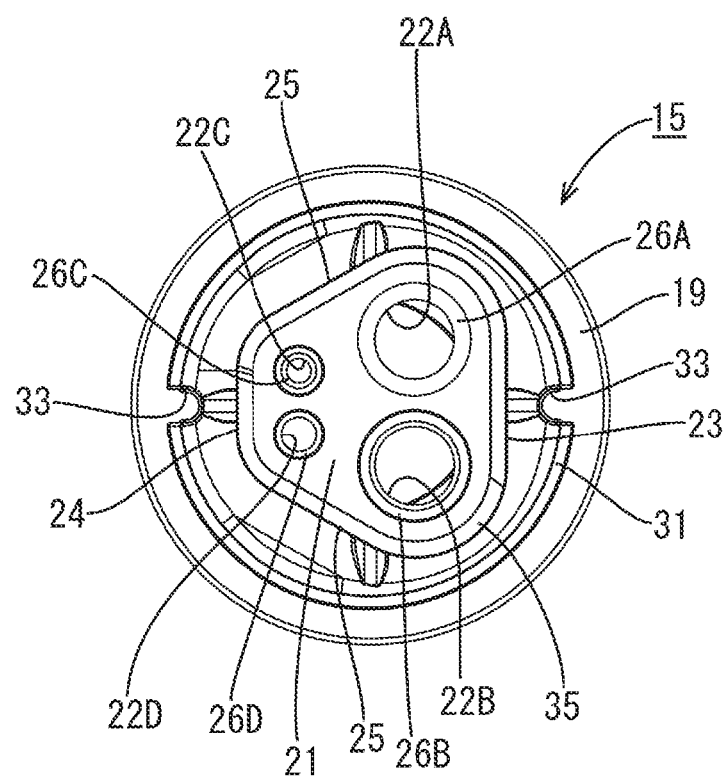
FIG. 9 is a front view illustrating a rubber stopper.

As illustrated in FIGS. 3, 4 and 9, the rubber stopper 15 includes an electric wire through portion 21 at an end opposite from the sheath fitting portion 18. The electric wire through portion 21 includes through holes 22A, 22B, 22C and 22D (four through holes in this embodiment) through which the first electric wire 13A, the second electric wire 13B, the third electric wire 13C, and the fourth electric wire 13D are passed, respectively. The through holes 22A, 22B, 22C and 22D include a first through hole 22A through which the first electric wire 13A is passed, a second through hole 22B through which the second electric wire 13B is passed, a third through hole 22C through which the third electric wire 13C is passed, and a fourth through hole 22D through which the fourth electric wire 13D is passed. The first to the fourth through holes 22A, 22B, 22C and 22D extend in the extending direction A.

As illustrated in FIG. 9, the electric wire through portion 21 has a trapezoidal cross section with rounded corners. The cross section of the electric wire through portion 21 includes a long side 23, a short side 24 that is parallel to the long side 23 and shorter than the long side, and two oblique sides 25 that connect ends of the long side 23 to ends of the short side.

The first through hole 22A and the second through hole 22B are formed side by side in a direction in which the long side 23 extends (the vertical direction in FIG. 9) in a portion of the electric wire through portion 21 closer to the long side 23. The third through hole 22C and the fourth through hole 22D are formed side by side in a direction in which the short side 24 extends (the vertical direction in FIG. 9) in a portion of the electric wire through portion 21 closer to the short side 24.

Figure 10:
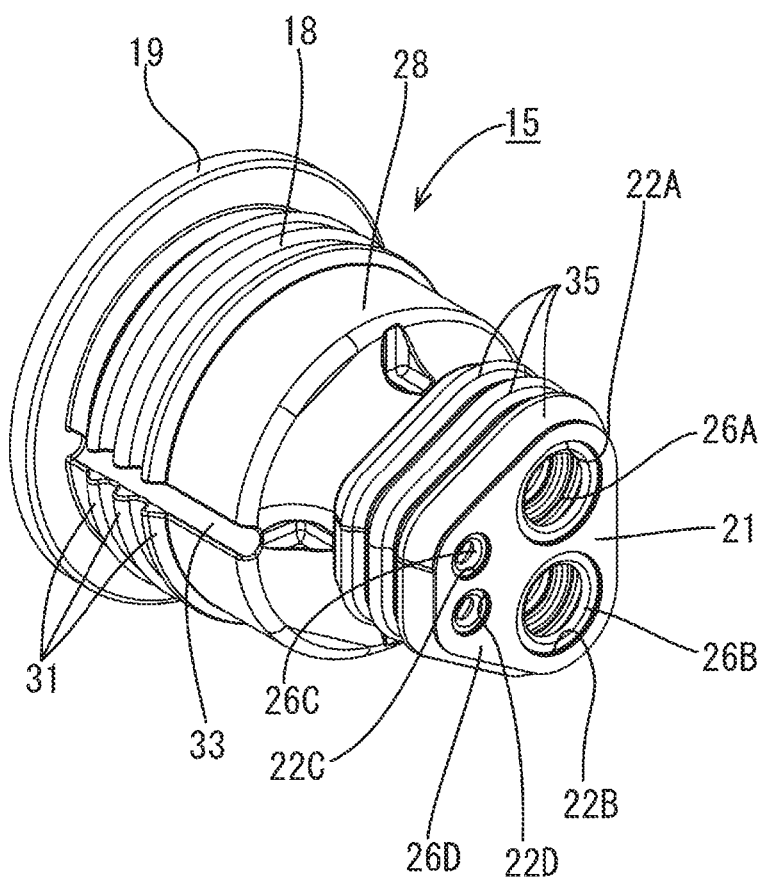
FIG. 10 is a perspective view illustrating the rubber stopper.

An inner diameter of the first through hole 22A is slightly larger than the outer diameter of the first electric wire 13A. As illustrated in FIGS. 9 and 10, a first electric wire-side lip 26A is formed on an inner wall of the first through hole 22A annularly along the circumferential direction of the first through hole 22A. The first electric wire-side lip 26A is tightly held against the outer periphery of the first electric wire 13A when the first electric wire 13A is passed through the first through hole 22A. According to the configuration, the rubber stopper 15 is tightly held against the first electric wire 13A.

An inner diameter of the second through hole 22B is slightly larger than the outer diameter of the second electric wire 13B. As illustrated in FIGS. 9 and 10, a second electric wire-side lip 26B is formed on an inner wall of the second through hole 22B annularly along the circumferential direction of the second through hole 22B. The second electric wire-side lip 26B is tightly held against the outer periphery of the second electric wire 13B when the second electric wire 13B is passed through the second through hole 22B. According to the configuration, the rubber stopper 15 is tightly held against the second electric wire 13B.

An inner diameter of the third through hole 22C is slightly larger than the outer diameter of the third electric wire 13C. As illustrated in FIGS. 9 and 10, a third electric wire-side lip 26C is formed on an inner wall of the third through hole 22C annularly along the circumferential direction of the third through hole 22C. The third electric wire-side lip 26C is tightly held against the outer periphery of the third electric wire 13C when the third electric wire 13C is passed through the third through hole 22C. According to the configuration, the rubber stopper 15 is tightly held against the third electric wire 13C.

An inner diameter of the fourth through hole 22D is slightly larger than the outer diameter of the fourth electric wire 13D. As illustrated in FIGS. 9 and 10, a fourth electric wire-side lip 26D is formed on an inner wall of the fourth through hole 22D annularly along the circumferential direction of the fourth through hole 22D. The fourth electric wire-side lip 26D is tightly held against the outer periphery of the fourth electric wire 13D when the fourth electric wire 13D is passed through the fourth through hole 22D. According to the configuration, the rubber stopper 15 is held against the fourth electric wire 13D.

As illustrated in FIGS. 3 and 4, the rubber stopper 15 includes a holding portion 28 between the sheath-side lips 20 and the electric wire through portion 21 inside the sheath fitting portion 18. The holding portion 28 is for holding the guide member 16 that includes guide holes 38A, 38B, 38C (examples of guide holes) and 38D through which the first electric wire 13A, the second electric wire 13B, the third electric wire 13C, and the fourth electric wire 13D are passed, respectively (four holes in this embodiment).

Cap 17

As illustrated in FIGS. 3 and 4, the cap 17 made of synthetic resin is fitted on the rubber stopper 15. The cap 17 is fitted to the rubber stopper 15 from the end 14A of the sheath 14 from which the portions of the first electric wire 13A, the second electric wire 13B, the third electric wire 13C, and the forth electric wire 13D are exposed (from the right side in FIG. 3). Namely, the cap 17 is fitted to the rubber stopper 15 from the front in the extending direction A.

The cap 17 includes a hole that extends from the end from which the first electric wire 13A, the second electric wire 13B, the third electric wire 13C, and the forth electric wire 13D are exposed toward the sheath 14 (toward the left side in FIG. 3). Namely, the cap 17 opens toward the rear in the extending direction. An opening edge of the cap 17 is brought into contact with the flange portion 19 of the rubber stopper 15 from the front in the extending direction A.

Figure 11:
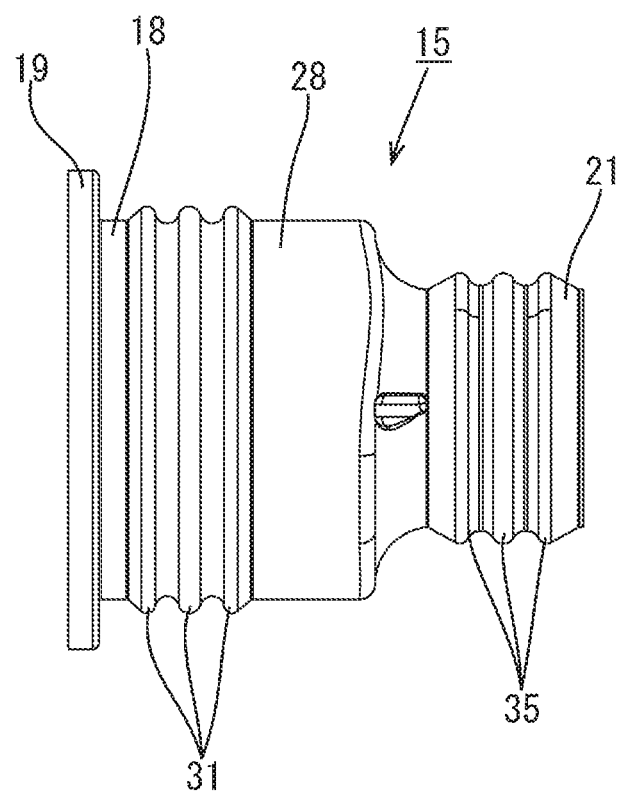
FIG. 11 is a plan view illustrating the rubber stopper.
Figure 12:
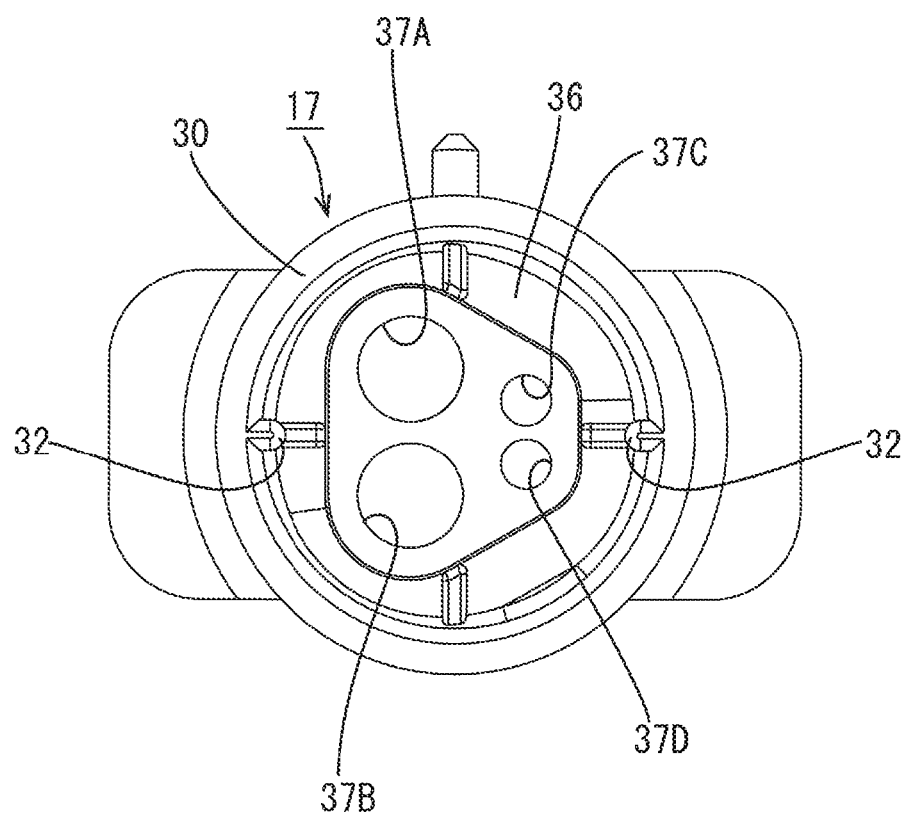
FIG. 12 is a rear view illustrating a cap.

The cap 17 includes a large diameter portion 30 that is fitted on the sheath fitting portion 18 of the rubber stopper 15 at a portion closer to the opening edge of the cap 17 (on the left side in FIG. 3). As illustrated in FIG. 12, the large diameter portion 30 has a round cross section along an outline of the sheath fitting portion 18. An inner periphery of the large diameter portion 30 is tightly held against large diameter portion-side lips 31 formed on the outer periphery of the sheath fitting portion 18 (three lips in this embodiment). As illustrated in FIGS. 10 and 11, the large diameter portion-side lips 31 protrude outward from the outer periphery of the sheath fitting portion 18. Furthermore, the large diameter portion-side lips 31 are formed along the circumferential direction of the sheath fitting portion 18. With the large diameter portion-side lips 31 tightly held against the inner periphery of the large diameter portion 30 of the cap 17, the large diameter portion 30 of the cap 17 is tightly held against the sheath fitting portion 18 of the rubber stopper 15.

As illustrated in FIGS. 6 and 12, the large diameter portion 30 of the cap 17 includes cap lock portions 32 (two cap lock portions in this embodiment) on an inner surface. The cap lock portions 32 have rib shapes that extend along a direction in which a hollow of the cap 17 extends. Two cap lock portions 32 are formed on the inner surface of the large diameter portion 30 at positions opposed to each other.

As illustrated in FIGS. 6 and 10, the rubber stopper 15 includes two cap lock catch portions 33 in outer peripheries of the sheath fitting portion 18 and the holding portion 28. The cap lock portions 32 (two cap lock portions in this embodiment) are engaged in the cap lock catch portions 33, respectively. The cap lock catch portions 33 have groove shapes that extend in a direction in which the sheath fitting portion 18 extends. The cap lock catch portions 33 are formed at positions corresponding to the cap lock portions 32 of the large diameter portion 30, respectively.

With the cap lock portions 32 of the large diameter portion 30 and the cap lock catch portions 33 of the sheath fitting portion 18 fitted together, a rotation of the rubber stopper 15 around the cap 17 in a circumferential direction of the rubber stopper 15 is restricted.

As illustrated in FIGS. 3 and 4, while the large diameter portion 30 of the cap 17 fitted on the sheath fitting portion 18 of the rubber stopper 15, the large diameter portion 30 presses the sheath fitting portion 18 inward in the radial direction of the sheath fitting portion 18. Therefore, the sheath fitting portion 18 is pressed against the outer periphery of the sheath 14 from the outer side. As a result, the sheath-side lips 20 of the sheath fitting portion 18 are tightly contact with the outer periphery of the sheath 14.

As illustrated in FIGS. 3 and 4, the cap 17 includes a small diameter portion 34 at a position farther from the opening of the cap 17 relative to the large diameter portion 30 (on the right side in FIG. 3). The small diameter portion 34 is fitted on the electric wire through portion 21 of the rubber stopper 15. An outer diameter of the small diameter portion 34 is smaller than the outer diameter of the large diameter portion 30. As illustrated in FIG. 12, the small diameter portion 34 has a trapezoidal cross section with rounded corners along an outline of the electric wire through portion 21.

As illustrated in FIGS. 3 and 4, an inner periphery of the small diameter portion 34 is tightly held against multiple small diameter-side lips 35 (three small diameter-side lips in this embodiment) formed on the outer periphery of the electric wire through portion 21. As illustrated in FIGS. 10 and 11, the small diameter-side lips 35 are formed on the outer periphery of the electric wire through portion 21 along the circumferential direction of the electric wire through portion 21 such that the small diameter-side lips 35 projects outward. With the small diameter portion-side lips 35 tightly held against the inner periphery of the small diameter portion 34 of the cap 17, the small diameter portion 34 of the cap 17 and the electric wire through portion 21 of the rubber stopper 15 are tightly fitted together.

As illustrated in FIGS. 3 and 4, while the small diameter portion 34 of the cap 17 is fitted on the electric wire through portion 21 of the rubber stopper 15, the small diameter portion 34 presses the electric wire through portion 21 inward in the radial direction of the electric wire through portion 21. Therefore, the electric wire through portion 21 is compressed by a force from the outer side. According to the configuration, the first to the fourth wire-side lips 26A, 26B, 26C, 26D tightly contact the outer peripheries of the first to the fourth electric wire 13A, 13B, 13C and 13D, respectively.

Figure 13:
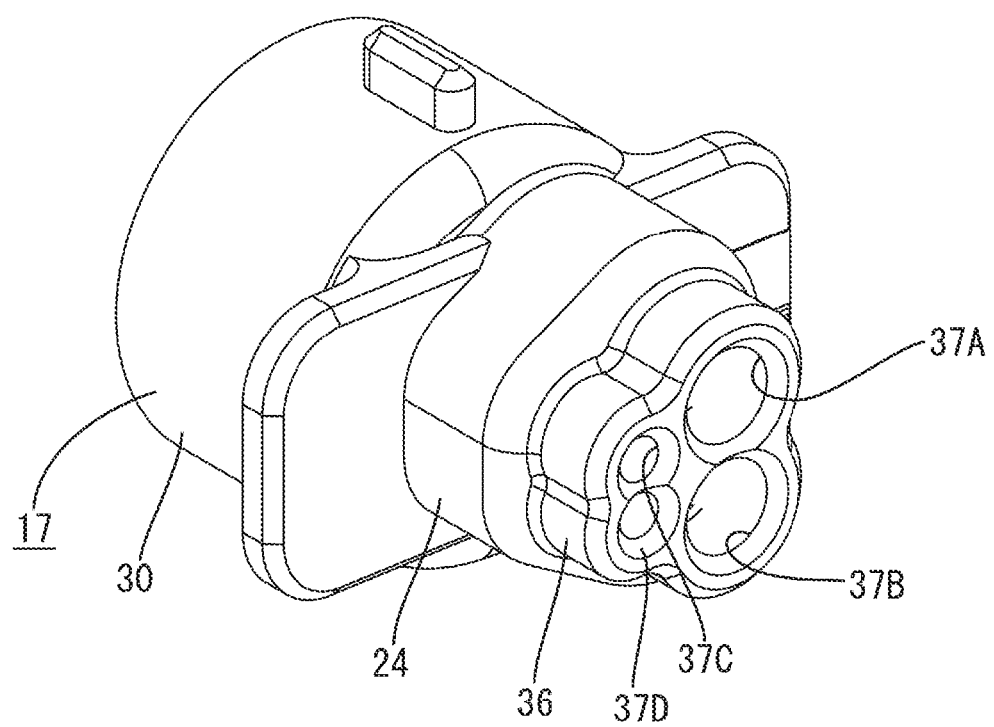
FIG. 13 is a perspective view illustrating the cap.
Figure 14:
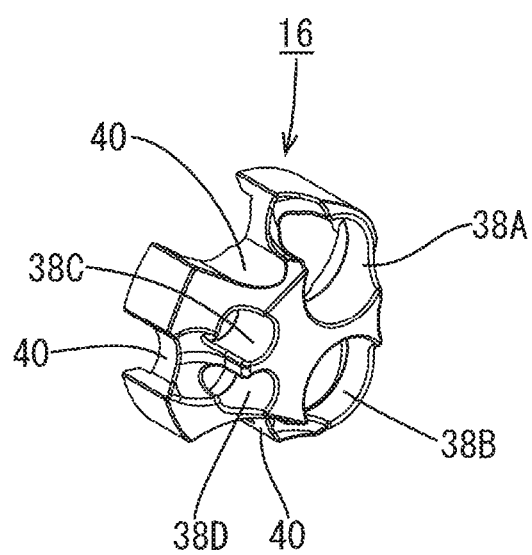
FIG. 14 is a perspective view illustrating a guide member.
Figure 15:
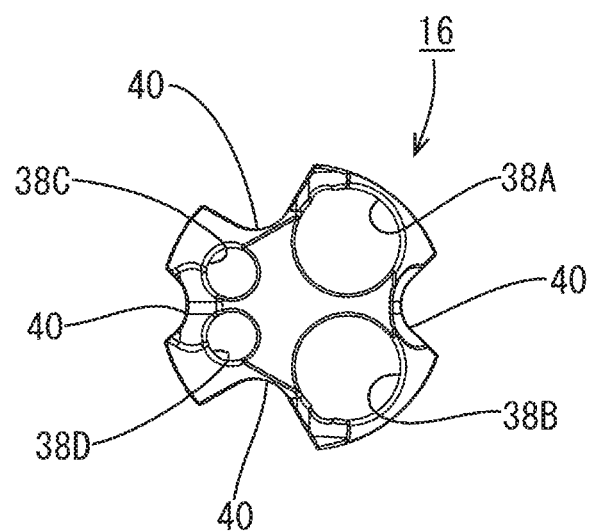
FIG. 15 is a front view illustrating the guide member.
Figure 16:
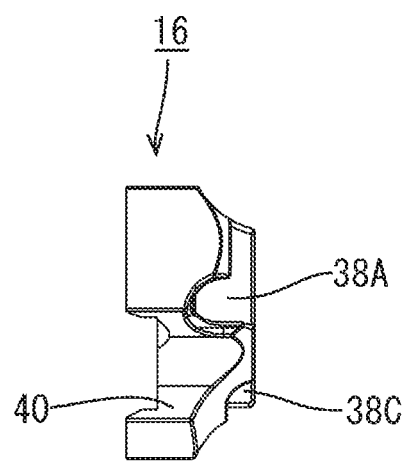
FIG. 16 is a plan view illustrating the guide member.
Figure 17:
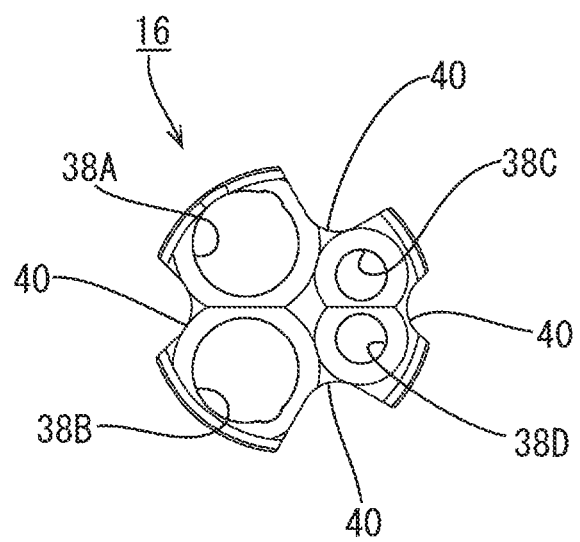
FIG. 17 is a rear view illustrating the guide member.

As illustrated in FIGS. 3 and 4, the cap 17 includes an end wall 36 at an opposite side from the opening of the cap 17. The end wall 36 is located more to the front than the electric wire through portion 21 of the rubber stopper 15 in the extending direction A. As illustrated in FIG. 13, the end wall 36 includes a first exiting hole 37A (an example of a guide hole), a second exiting hole 37B (an example of a guide hole), a third exiting hole 37C (an example of a guide hole), and a fourth exiting hole 37D (an example of a guide hole). The exiting holes 37A to 37D are through holes through which the first electric wire 13A, the second electric wire 13B, the third electric wire 13C, the fourth electric wire 13D exit from the cap 17, respectively.

Specifically, the first electric wire 13A is passed through the first exiting hole 37A, the second electric wire 13B is passed through the second exiting hole 37B, the third electric wire 13C is passed through the third exiting hole 37C, and the fourth electric wire 13D is passed through the fourth exiting hole 37D.

As illustrated in FIG. 6, with the cap lock portions 32 of the large diameter portion 30 of the cap 17 engaged in the cap lock catch portions 33 of the sheath fitting portion 18 of the rubber stopper 15, a position of the rubber stopper 15 relative to the cap 17 is defined. According to the configuration, as illustrated in FIGS. 3 and 4, the first to the fourth through holes 22A, 22B, 22C and 22D of the rubber stopper 15 are aligned with the first to the fourth exiting holes 37A, 37B, 37C and 37D of the cap 17, respectively. Specifically, the first through hole 22A is aligned with the first exiting hole 37A, the second through hole 22B is aligned with the second exiting hole 37B, the third through hole 22C is aligned with the third exiting hole 37C, and the fourth through hole 22D is aligned with the fourth exiting hole 37D.

Guide Member 16

As illustrated in FIGS. 14 to 17, the guide member 16 made of synthetic resin includes a first guide hole 38A, a second guide hole 38B, a third guide hole 38C, and a fourth guide hole 38D that are through holes through which the first electric wire 13A, the second electric wire 13B, the third electric wire 13C, and the fourth electric wire 13D are passed, respectively.

The guide member 16 is located more to the rear than the electric wire through portion 21 in the extending direction A when the guide member 16 is held by the holding portion 28 of the rubber stopper 15.

As illustrated in FIGS. 6 and 8, the rubber stopper 15 includes multiple guide member lock portions 39 (four guide member lock portions 39 in this embodiment) which protrude inward from the inner periphery of the holding portion 28.

The guide member 16 includes multiple guide member lock catch portions 40 (four guide member lock catch portions 40 in this embodiment) in which the guide member lock portions 39 are fitted. The guide member lock catch portions 40 are recesses formed in the outer periphery of the guide member 16. The guide member lock catch portions 40 are located at positions corresponding to the guide member lock portions 39, respectively.

The guide member lock portions 39 of the holding portion 28 of the rubber stopper 15 and the guide member lock catch portions 40 of the guide member 16 are engaged, respectively. According to the configuration, the guide member 16 is held in a condition that a rotation of the guide member 16 in the circumferential direction of the guide member 16 relative to the rubber stopper 15. Namely, a position of the rubber stopper 15 relative to the guide member 16 is defined. As illustrated in FIGS. 3 and 4, the first to the fourth through holes 22A, 22B, 22C and 22D of the rubber stopper 15 are aligned with the first to the fourth guide holes 38A, 38B, 38C and 38D of the guide member 16, respectively. Specifically, the first through hole 22A is aligned with the first guide hole 38A, the second through hole 22B is aligned with the second guide hole 38B, the third through hole 22C is aligned with the third guide hole 38C, and the fourth through hole 22D is aligned with the fourth guide hole 38D.

Production Process

An example of a production process will be described. The production process according to this embodiment is not limited to a production process described below.

First, a portion of the sheath 14 of the multicore cable 11 is stripped by a known method. As a result, the portions of the first to the fourth electric wires 13A, 13B, 13C and 13D are exposed from the end 14A of the sheath 14.

Figure 18:
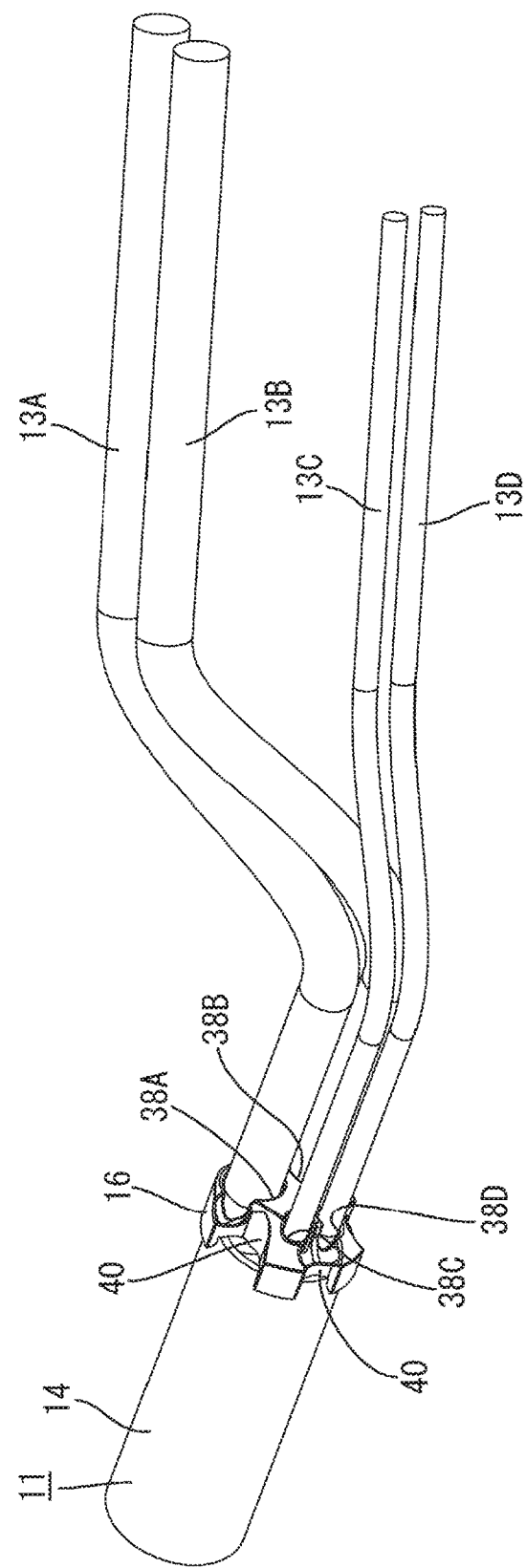
FIG. 18 is a perspective view illustrating the guide member attached to the electric wires of the multicore cable including a portion with a sheath stripped.

Next, as illustrated in FIG. 18, the first to the fourth electric wires 13A, 13B, 13C and 13D are passed through the first to the fourth guide holes 38A, 38B, 38C and 38D of the guide member 16, respectively. Specifically, the first electric wire 13A is passed through the first guide hole 38A, the second electric wire 13B is passed through the second guide hole 38B, the third electric wire 13C is passed through the third guide hole 38C, and the fourth electric wire 13D is passed through the fourth guide hole 38D.

Next, the first to the fourth electric wires 13A, 13B, 13C and 13D are passed through the first to the fourth through holes 22A, 22B, 22C and 22D, respectively. Specifically, the first electric wire 13A is passed through the first through hole 22A, the second electric wire 13B is passed through the second through hole 22B, the third electric wire 13C is passed through the third through hole 22C, and the fourth electric wire 13D is passed through the fourth through hole 22D. Then, the rubber stopper 15 is moved to a position at which the guide member 16 is located.

Figure 19:
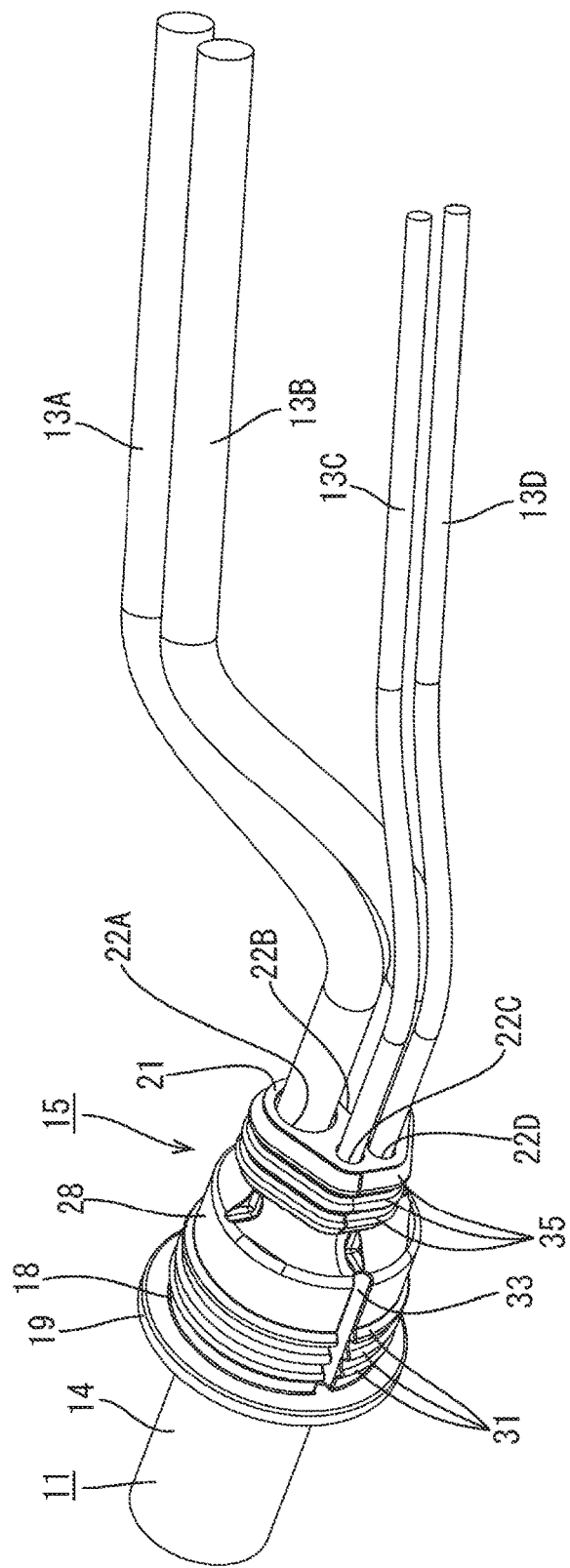
FIG. 19 is a perspective view illustrating a rubber stopper fitted on an end of the sheath of the multicore cable.

Next, a position of the rubber stopper 15 relative to the guide member 16 is adjusted such that the first to the fourth through holes 22A, 22B, 22C and 22D of the rubber stopper 15 are aligned with the first to the fourth guide holes 38A, 38B, 38C and 38D of the guide member 16, respectively. At this position, guide member 16-side lock portions of the rubber stopper 15 are engaged in guide member 16-side lock catch portions of the guide member 16. According to the configuration, the guide member 16 is held by the holding portion 28 of the rubber stopper 15 with the first to the fourth guide holes 38A, 38B, 38C and 38D of the guide member 16 aligned with the first to the fourth through holes 22A, 22B, 22C and 22D of the rubber stopper 15, respectively. Then, as illustrated in FIG. 19, the rubber stopper 15 is moved to the end 14A of the sheath 14 to fit the sheath fitting portion 18 of the rubber stopper 15 on the end 14A of the sheath 14.

Next, the first to the fourth electric wires 13A, 13B, 13C and 13D are passed through the first to the fourth exiting holes 37A, 37B, 37C and 37D of the cap 17, respectively. Specifically, the first electric wire 13A is passed through the first exiting hole 37A, the second electric wire 13B is passed through the second exiting hole 37B, the third electric wire 13C is passed through the third exiting hole 37C, and the fourth electric wire 13D is passed through the fourth exiting hole 37D. Then, the cap 17 is moved to a position at which the rubber stopper 15 is fitted on the end 14A of the sheath 14.

Next, a position of the cap 17 relative to the rubber stopper 15 is adjusted such that the first to the fourth exiting holes 37A, 37B, 37C and 37D of the cap 17 are aligned with the first to the fourth through holes 22A, 22B, 22C and 22D of the rubber stopper 15. At this position, the guide member 16-side lock portions of the rubber stopper 15 are engaged in the guide member 16-side lock catch portions of the guide member 16. The cap 17 is fitted on the rubber stopper 15 with the first to the fourth exiting holes 37A, 37B, 37C and 37D of the cap 17 aligned with the first to the fourth through holes 22A, 22B, 22C and 22D of the rubber stopper 15, respectively. Then, the cap 17 is pushed until the cap 17 is brought into contact with the flange portion 19 of the rubber stopper 15. The sealing member 10 according to this embodiment is complete and a sealing structure 12 of the multicore cable 11 is formed (see FIG. 1).

Functions and Effects of this Embodiment

Next, functions and effects of this embodiment will be described. The first to the fourth electric wires 13A, 13B, 13C and 13D are passed through the first to the fourth exiting holes 37A, 37B, 37C and 37D of the cap 17, respectively, and through the first to the fourth guide holes 38A, 38B, 38C and 38D of the guide member 16, respectively. According to the configuration, the first to the fourth electric wires 13A, 13B, 13C and 13D are properly guided to the first to the fourth through holes 22A, 22B, 22C and 22D, respectively. Therefore, the first to the fourth electric wires 13A, 13B, 13C and 13D are tightly held against the inner walls of the first to the fourth through holes 22A, 22B, 22C and 22D, respectively. Therefore, air tightness between the rubber stopper 15 and the first to the fourth electric wires 13A, 13B, 13C and 13D is less likely to decrease.

According to this embodiment, the guide member 16 includes the guide member lock catch portions 40 for locking with the rubber stopper 15 and the rubber stopper 15 includes the guide member lock portions 39 that are engaged with the guide member lock catch portions 40. With the guide member lock portions 39 engaged with the guide member lock catch portions 40, the position of the guide member 16 relative to the rubber stopper 15 is maintained at the position at which the first to the fourth guide holes 38A, 38B, 38C and 38D of the guide member 16 are aligned with the first to the fourth through holes 22A, 22B, 22C and 22D of the rubber stopper 15. According to the configuration, the first to the fourth guide holes 38A, 38B, 38C and 38D of the guide member 16 are properly held at the position at which the first to the fourth guide holes 38A, 38B, 38C and 38D of the guide member 16 are aligned with the first to the fourth through holes 22A, 22B, 22C and 22D of the rubber stopper 15. Therefore, the air tightness between the rubber stopper 15 and the first to the fourth electric wires 13A, 13B, 13C and 13D is less likely to decrease.

According to this embodiment, the cap 17 includes the cap lock portions 32 for locking with the rubber stopper 15 and the rubber stopper 15 includes the cap lock catch portions 33 with which the cap lock portions 32 are engaged.

With the cap lock portions 32 engaged with the cap lock catch portions 33, the position of the cap 17 relative to the rubber stopper 15 is maintained at the position at which the first to the fourth exiting holes 37A, 37B, 37C and 37D of the cap 17 are aligned with the first to the fourth through holes 22A, 22B, 22C and 22D of the rubber stopper 15. According to the configuration, the first to the fourth exiting holes 37A, 37B, 37C and 37D are properly aligned with the first to the fourth through holes 22A, 22B, 22C and 22D. Therefore, the air tightness between the rubber stopper 15 and the first to the fourth electric wires 13A, 13B, 13C and 13D is less likely to decrease.

According to this embodiment, the cap 17 is located more to the front than the electric wire through portion 21 in the extending direction A and the guide member 16 is located more to the rear than the electric wire through portion 21 in the extending direction A. According to the configuration, the first to the fourth electric wires 13A, 13B, 13C and 13D are properly guided from a side more to the front than the electric wire through portion 21 in the extending direction A to the first to the fourth through holes 22A, 22B, 22C and 22D, respectively. Furthermore, the first to the fourth electric wires 13A, 13B, 13C and 13D are properly guided from a side more to the rear than the electric wire through portion 21 in the extending direction A to the first to the fourth through holes 22A, 22B, 22C and 22D, respectively. Therefore, the air tightness between the rubber stopper 15 and the first to the fourth electric wires 13A, 13B, 13C and 13D is less likely to decrease.

According to this embodiment, the first to the fourth wire-side lips 26A, 26B, 26C and 26D that are tightly held against the outer peripheries of the first to the fourth electric wires 13A, 13B, 13C and 13D, respectively, are formed on the inner walls of the first to the fourth through holes 22A, 22B, 22C and 22D. Because the first to the fourth wire-side lips 26A, 26B, 26C and 26D are held against the outer peripheries of the first to the fourth electric wires 13A, 13B, 13C and 13D, respectively, the air tightness between the rubber stopper 15 and the first to the fourth electric wires 13A, 13B, 13C and 13D is less likely to decrease.

Other Embodiments

The technique described in the present specification is not limited to the embodiments, which have been described using the foregoing descriptions and the drawings. For example, embodiments described below are also encompassed within the technical scope of the technique described in the present specification.

The sealing member may be configured to include a positioning member that is a component different from the guide member and the rubber stopper. With the guide member positioned relative to the positioning member and the rubber stopper positioned relative to the positioning member, the through holes and the guide holes are positioned such that the through holes are aligned with the guide holes.

In the above embodiment, the sealing member 10 includes both the gap 17 and the guide member 16. However, the sealing member 10 may include only the cap 17 or only the guide member 16.

The multicore cable 11 may include two or three electric wires or five or more electric wires.

The electric wires include two kinds of the electric wires having two different outer diameters. However, the electric wires may include three kinds of electric wires having three different outer diameters.

The electric wires may have the same outer diameter.

The electric wires may be shielded electric wires. The electric wires may be twisted electric wires each including multiple metal thin wires that are twisted together. The electric wires may be single-core electric wires each having metal poles as core wires. The electric wires may be selected as appropriate.

The multicore cable 11 may be a cabtire cable or a multicore shielded electric wire that includes multiple electric wires wrapped in a shield layer. The multicore cable 11 can be selected from any cables as appropriate.

According to the sealing member 10 of the embodiment can block any type of liquid such as water, oil, and organic solvent.

In the embodiment, the guide member 16, the rubber stopper 15, and the cap 17 are attached in this sequence to the portion of the multicore cable 11 from which the sheath 14 is stripped to prepare the sealing member 10 and the sealing structure 12 of the multicore cable 11. However, the multicore cable 11 and the sealing member 10 may be assembled together by passing the electric wires of the multicore cable 11 without the sheath 14 through the sealing member 10 that is attached in advance.

LIST OF REFERENCE NUMERALS

10: sealing member
13A: first electric wire
13B: second electric wire
13C: third electric wire
13D: fourth electric wire
15: rubber stopper
16: guide member
17: cap
21: electric wire through portion
22A: first through hole
22B: second through hole
22C: third through hole
22D: fourth through hole
26A: first electric wire-side lip
26B: second electric wire-side lip
26C: third electric wire-side lip
26D: fourth electric wire-side lip
32: cap lock portion
33: cap lock catch portion
38A: first guide hole
38B: second guide hole
38C: third guide hole
38D: fourth guide hole
39: guide member lock portion
40 guide member lock catch portion
A: extending direction

The invention claimed is:

1. A sealing member comprising:
a rubber stopper including an electric wire through portion including a plurality of through holes through which electric wires are passed, respectively;
a rear guide member including a plurality of guide holes located more to a rear than the electric wire through portion in an extending direction in which the electric wires passed through the plurality of through holes extend and through which the electric wires are passed, the plurality of guide holes being aligned with the plurality of through holes of the rubber stopper; and
the rubber stopper includes a holding portion inside the rubber stopper for holding the rear guide member.

2. The sealing member according to claim 1, wherein
the electric wires are exposed from an end of a multicore cable including the electric wires wrapped in a sheath, and
the rear guide member is located close to the end of the multicore cable.

3. The sealing member according to claim 1, wherein
the electric wires are exposed from an end of a multicore cable including the electric wires wrapped in a sheath,
the rubber stopper includes a sheath fitting portion fitted on the sheath, and
the rear guide member is located inside the sheath fitting portion.

4. The sealing member according to claim 3, wherein
a sheath-side lip is formed on an inner periphery of the sheath fitting portion, the sheath-side lip being tightly held against an outer periphery of the sheath,
electric wire-side lips are formed on inner walls of the plurality of through holes, respectively, and
the rear guide member is located between the sheath-side lip and the electric wire-side lip.

5. The sealing member according to claim 1, wherein
the rear guide member includes a lock portion for locking with the rubber stopper,
the rubber stopper includes a lock catch portion with which the lock portion is engaged, and
the rubber stopper is held at a position relative to the rear guide member with the lock portion engaged with the lock catch portion such that the plurality of through holes of the rubber stopper are aligned with the plurality of guide holes of the rear guide member.

6. The sealing member according to claim 1, further comprising a front guide member located more to a front than the electric wire through portion in the extending direction, the front guide member including a plurality of guide holes aligned with the plurality of through holes of the rubbers stopper.

7. The sealing member according to claim 1, wherein
electric wire-side lips are formed on inner walls of the plurality of through holes, the electric wire-side lips being tightly held against outer peripheries of the electric wires, respectively.

8. A sealing member comprising:
a rubber stopper including an electric wire through portion including a plurality of through holes through which electric wires are passed, respectively;
a rear guide member including a plurality of guide holes located more to a rear than the electric wire through portion in an extending direction in which the electric wires passed through the plurality of through holes extend and through which the electric wires are passed, the plurality of guide holes being aligned with the plurality of through holes of the rubber stopper; and
the rear guide member includes a lock portion for locking with the rubber stopper,
the rubber stopper includes a lock catch portion with which the lock portion is engaged, and
the rubber stopper is held at a position relative to the rear guide member with the lock portion engaged with the lock catch portion such that the plurality of through holes of the rubber stopper are aligned with the plurality of guide holes of the rear guide member.

9. The sealing member according to claim 8, wherein
the electric wires are exposed from an end of a multicore cable including the electric wires wrapped in a sheath, and the rear guide member is located close to the end of the multicore cable.

10. The sealing member according to claim 8, wherein the electric wires are exposed from an end of a multicore cable including the electric wires wrapped in a sheath, the rubber stopper includes a sheath fitting portion fitted on the sheath, and the rear guide member is located inside the sheath fitting portion.

11. The sealing member according to claim 10, wherein a sheath-side lip is formed on an inner periphery of the sheath fitting portion, the sheath-side lip being tightly held against an outer periphery of the sheath, electric wire-side lips are formed on inner walls of the plurality of through holes, respectively, and the rear guide member is located between the sheath-side lip and the electric wire-side lip.

12. The sealing member according to any claim 8, further comprising a front guide member located more to a front than the electric wire through portion in the extending direction, the front guide member including a plurality of guide holes aligned with the plurality of through holes of the rubbers stopper.

13. The sealing member according to claim 8, wherein electric wire-side lips are formed on inner walls of the plurality of through holes, the electric wire-side lips being tightly held against outer peripheries of the electric wires, respectively.

14. A sealing member comprising:
a rubber stopper including an electric wire through portion including a plurality of through holes through which electric wires are passed, respectively;
a rear guide member including a plurality of guide holes located more to a rear than the electric wire through portion in an extending direction in which the electric wires passed through the plurality of through holes extend and through which the electric wires are passed, the plurality of guide holes being aligned with the plurality of through holes of the rubber stopper; and
further comprising a front guide member located more to a front than the electric wire through portion in the extending direction, the front guide member including a plurality of guide holes aligned.

15. The sealing member according to claim 14, wherein the electric wires are exposed from an end of a multicore cable including the electric wires wrapped in a sheath, and the rear guide member is located close to the end of the multicore cable.

16. The sealing member according to claim 14, wherein the electric wires are exposed from an end of a multicore cable including the electric wires wrapped in a sheath, the rubber stopper includes a sheath fitting portion fitted on the sheath, and the rear guide member is located inside the sheath fitting portion.

17. The sealing member according to claim 14, wherein a sheath-side lip is formed on an inner periphery of the sheath fitting portion, the sheath-side lip being tightly held against an outer periphery of the sheath, electric wire-side lips are formed on inner walls of the plurality of through holes, respectively, and the rear guide member is located between the sheath-side lip and the electric wire-side lip.

18. The sealing member according to claim 14, wherein electric wire-side lips are formed on inner walls of the plurality of through holes, the electric wire-side lips being tightly held against outer peripheries of the electric wires, respectively.

* * * * *